H. E. HAYWARD.
DRIVE CHAIN.
APPLICATION FILED JAN. 18, 1912.
1,126,462. Patented Jan. 26, 1915.
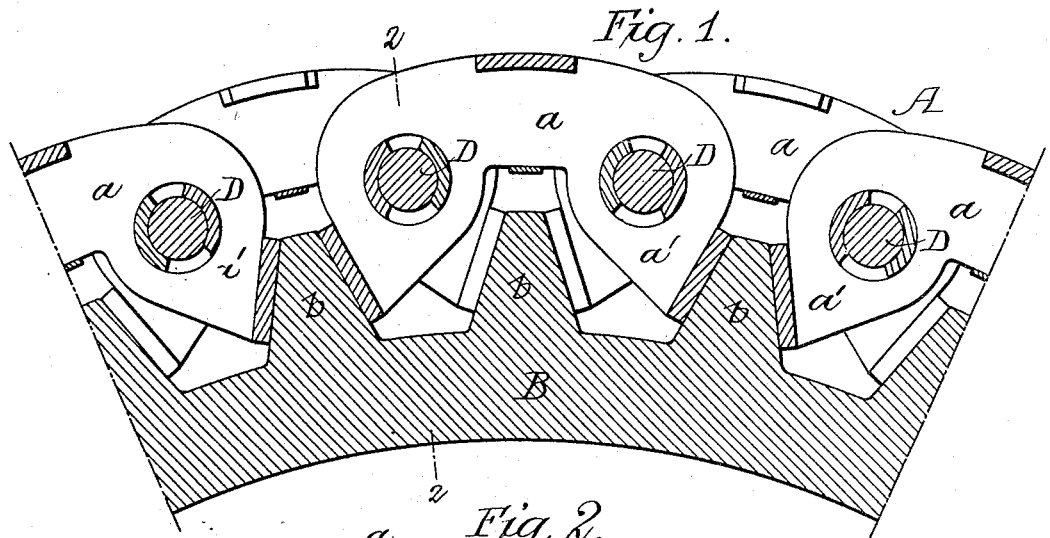
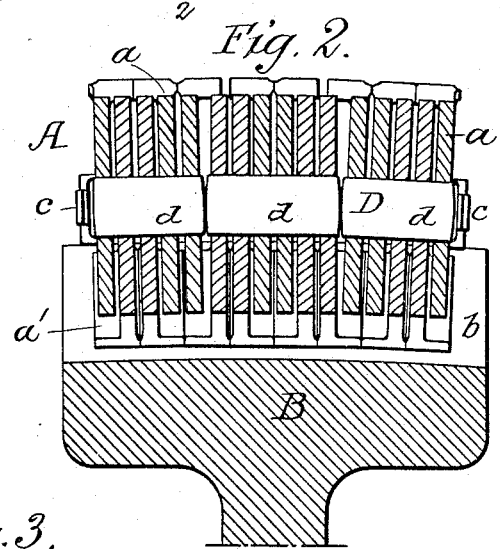
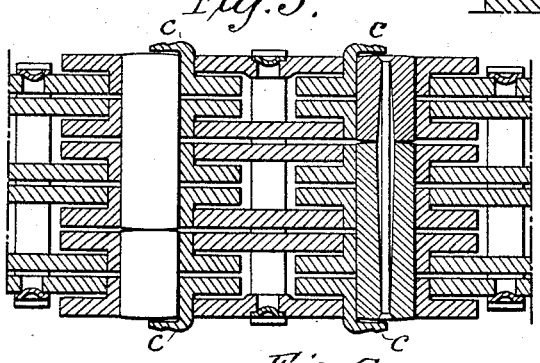
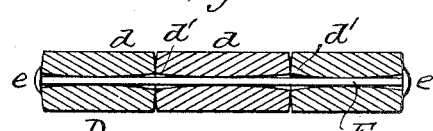
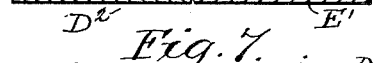
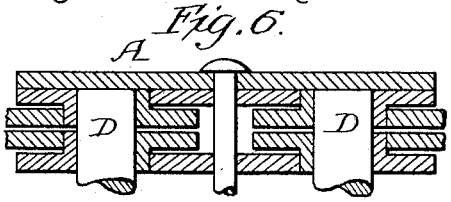
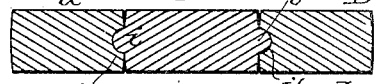
Witnesses:
William H. Rivori
Wills A. Burrowes
Inventor:
Henry E. Hayward
by his Attorneys Howson & Howson

UNITED STATES PATENT OFFICE.

HENRY E. HAYWARD, OF PHILADELPHIA, PENNSYLVANIA, ASSIGNOR TO LINK-BELT COMPANY, OF CHICAGO, ILLINOIS, A CORPORATION OF ILLINOIS.

DRIVE-CHAIN.

1,126,462.  Specification of Letters Patent.  Patented Jan. 26, 1915.

Application filed January 18, 1912. Serial No. 671,810.

*To all whom it may concern:*

Be it known that I, HENRY E. HAYWARD, a citizen of the United States, residing in Philadelphia, Pennsylvania, have invented certain Improvements in Drive-Chains, of which the following is a specification.

This invention is particularly adapted for use in connection with crowned sprocket wheels, *i. e.*, wheels in which there is a slight transverse curve to the sprocket teeth so that the drive chain, in order to accurately fit the sprocket wheel, must be so constructed that it can be flexed transversely.

The object of my invention is to construct a drive chain so that it will freely adapt itself to the shape of a sprocket wheel around which it passes. This object I attain by making the pivot pins in two or more sections, as will be fully described hereafter, reference being had to the accompanying drawings, in which:—

Figure 1, is a longitudinal sectional view of a drive chain and sprocket wheel illustrating my invention; Fig. 2, is a transverse sectional view showing the chain applied to a crowned sprocket wheel; Fig. 3, is a view showing the staggering of the joints of the pivot pins; Figs. 4 and 5, are views showing means of fastening the several sections of the pivot pins together; Fig. 6, is a view illustrating one method of retaining the pin in position; and Figs. 7 and 8, are views of further modifications of the pin.

A is a drive chain of the type having a body portion in which the links are made up of a series of plates $a$ and, in the present instance, these plates have teeth $a'$ which engage the teeth $b$ of the sprocket wheel B.

In order to dispense with the side flanges or other projecting means for retaining the chain in the proper position on the sprocket wheels, it has been found that by crowning the sprocket wheels slightly the chain will remain in position without other guards. It has heretofore been the common practice to connect the several links or link plates of the chain together by one piece pivot pins extending from one side of the chain to the other, but by my invention I make the pivot pins in two or more sections, as clearly illustrated in Fig. 2, so that the chain can be flexed transversely to accommodate itself to the shape of the sprocket wheel around which it passes.

In Fig. 2, I have shown the pivot pin D made of three sections $d$; the abutting ends being slightly rounded so that the sections will readily adapt themselves to the transverse curve of the chain. In this type of pivot pin, I prefer to have each section so that it will freely rotate in the chain and, in order to accomplish this, lips $c$ are formed on the ends of certain of the link plates in the present instance, which extend over the ends of the pins and prevent their lateral displacement. In some instances, in place of the projections, the outside links may be blanks extending over the pivot pin; the pivot pin stopping short of the end link so that each blank will hold the pin in position, as illustrated in Fig. 6.

In assembling the chain, I prefer to stagger the joints of the pivot pins, as indicated in Fig. 3. If it is found desirable to hold the several sections of the pivot pins together, I may perforate the pins, as shown at $d'$, Fig. 4, and couple them by means of a flexible bolt E having a head $e$ at each end. The openings $d'$ for the passage of the bolt are preferably enlarged at each end so that the pivot can be readily flexed.

In Fig. 5, I have shown another modification in which a rigid bolt E' is used and, in this instance, the openings $d^2$ in the pivot pin sections $D^2$ are shown tapered, being much larger at the center than the bolt. This allows the pin sections to accommodate themselves to the sprocket wheels without deflecting the retaining bolt.

In some instances, it may be desirable to provide means for retaining the several sections in line without the use of a bolt, and the construction illustrated in Fig. 7 may be used in this instance. A rounded projection $i$ on one section of the pin enters a like cavity $i'$ in the adjoining section, allowing the pin to be flexed, yet keeping the sections in proper alinement.

In Fig. 8, I have illustrated each section provided with a socket $i^2$ and mounted between the sections are balls I, which accomplish the same purpose as the construction shown in Fig. 7.

Other means of fastening or alining the pivot pins may be resorted to without departing from the essential features of the invention, and it will be understood that the pivot pin may be made in any of a number of sections, depending upon the type of chain to which the invention is applied.

I claim:

1. The combination in a drive chain, of plates assembled side by side forming links; plain cylindrical pivot pins made in sections; one section abutting another; means at each side of the chain extending over the pivot pin opening to hold the sections in position; and means for laterally holding the plates of the chain together independently of the pivot pins."

2. A drive chain made up of a series of link plates; pins coupling the several plates together, the pivot pins being made of a series of sections, the end of each section being rounded so as to abut against the rounded portion of an adjoining section.

3. A chain made up of a series of link plates; and pivot pins coupling the plates together, each pivot pin being made of two sections, the sections having longitudinal holes reduced in diameter near one end; with a bolt extending through the holes of both sections and the heads of the bolts bearing against that portion of the pivot pin which is reduced in diameter so that the pivot pin can flex without flexing the bolt.

In testimony whereof, I have signed my name to this specification, in the presence of two subscribing witnesses.

HENRY E. HAYWARD.

Witnesses:
 WM. E. SHUPE,
 WM. A. BARR.